US011514353B2

(12) United States Patent
Gupta et al.

(10) Patent No.: US 11,514,353 B2
(45) Date of Patent: Nov. 29, 2022

(54) GENERATING, USING A MACHINE LEARNING MODEL, REQUEST AGNOSTIC INTERACTION SCORES FOR ELECTRONIC COMMUNICATIONS, AND UTILIZATION OF SAME

(71) Applicant: Google LLC, Mountain View, CA (US)

(72) Inventors: Archit Gupta, Mountain View, CA (US); Hariharan Chandrasekaran, Sunnyvale, CA (US); Harish Chandran, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 974 days.

(21) Appl. No.: 15/795,204

(22) Filed: Oct. 26, 2017

(65) Prior Publication Data

US 2019/0130304 A1  May 2, 2019

(51) Int. Cl.
*G06N 5/02* (2006.01)
*G06N 7/00* (2006.01)
*G06N 20/00* (2019.01)
*G06F 16/783* (2019.01)
*G06F 16/33* (2019.01)
(Continued)

(52) U.S. Cl.
CPC ........... *G06N 20/00* (2019.01); *G06F 16/334* (2019.01); *G06F 16/583* (2019.01); *G06F 16/783* (2019.01); *G06F 16/9536* (2019.01); *G06N 5/02* (2013.01); *G06N 7/005* (2013.01)

(58) Field of Classification Search
CPC ................................. G06N 5/02; G06N 7/005
See application file for complete search history.

(56) References Cited

U.S. PATENT DOCUMENTS

| 8,417,713 | B1 | 4/2013 | Blair-Goldensohn et al. |
| 2004/0267723 | A1* | 12/2004 | Bharat ............... G06Q 30/0256 |
| 2005/0223002 | A1* | 10/2005 | Agarwal ............ G06Q 30/0258 |

(Continued)

OTHER PUBLICATIONS

Constine, J.; How Facebook News Feed Works; 10 pages; dated Sep. 6, 2016.

(Continued)

*Primary Examiner* — George Giroux
(74) *Attorney, Agent, or Firm* — Middleton Reutlinger

(57) ABSTRACT

Training and/or utilizing a machine learning model to generate request agnostic predicted interaction scores for electronic communications, and to utilization of request agnostic predicted interaction scores in determining whether, and/or how, to provide corresponding electronic communications to a client device in response to a request. A request agnostic predicted interaction score for an electronic communication provides an indication of quality of the communication, and is generated independent of corresponding request(s) for which it is utilized. In many implementations, a request agnostic predicted interaction score for an electronic communication is generated "offline" relative to corresponding request(s) for which it is utilized, and is pre-indexed with (or otherwise assigned to) the electronic communication. This enables fast and efficient retrieval, and utilization, of the request agnostic interaction score by computing device(s), when the electronic communication is responsive to a request.

19 Claims, 7 Drawing Sheets

(51) Int. Cl.
*G06F 16/9536* (2019.01)
*G06F 16/583* (2019.01)

(56) References Cited

U.S. PATENT DOCUMENTS

| | | | | |
|---|---|---|---|---|
| 2011/0258049 A1* | 10/2011 | Ramer | ............... | G06Q 30/0273 |
| | | | | 705/14.66 |
| 2012/0004978 A1* | 1/2012 | Kothari | ................. | G06Q 30/02 |
| | | | | 705/14.42 |
| 2013/0124297 A1* | 5/2013 | Hegeman | ............... | G06Q 30/02 |
| | | | | 705/14.42 |
| 2013/0254329 A1* | 9/2013 | Lin | .................... | G06Q 30/0269 |
| | | | | 709/217 |
| 2013/0346182 A1* | 12/2013 | Cheng | ................ | G06Q 30/0242 |
| | | | | 705/14.41 |
| 2014/0129331 A1* | 5/2014 | Spivack | ............. | G06Q 30/0255 |
| | | | | 705/14.53 |
| 2014/0214555 A1* | 7/2014 | Feldman | ............ | G06Q 30/0275 |
| | | | | 705/14.71 |
| 2015/0046467 A1* | 2/2015 | Hummel | ............. | G06F 16/9535 |
| | | | | 707/748 |
| 2015/0049910 A1 | 2/2015 | Ptucha et al. | | |
| 2016/0134580 A1 | 5/2016 | Castera et al. | | |
| 2016/0224672 A1 | 8/2016 | Bindal et al. | | |
| 2017/0061468 A1* | 3/2017 | You | .................... | G06Q 30/0277 |
| 2017/0186029 A1* | 6/2017 | Morris | ............... | G06Q 30/0243 |
| 2018/0063062 A1* | 3/2018 | Burdakov | ............. | H04L 67/306 |
| 2018/0173376 A1* | 6/2018 | Cohen | .................... | H04L 67/20 |

OTHER PUBLICATIONS

European Patent Office, International Search Report and Written Opinion of PCT Ser No. PCT/US2018/057317; 20 pages; dated Feb. 12, 2019.
European Pa 1 Ent Office; Communication Pursuant to Article 94(3) EPC issue in Application No. 18803824.4.; 9 pages; dated Feb. 3, 2021.
European Patent Office; Summons to attend oral proceedings pursuant to Rule 115(1) issued in Application No. 18803824.4, 11 pages, dated Apr. 13, 2022.

* cited by examiner

GENERATING, USING A MACHINE LEARNING MODEL, REQUEST AGNOSTIC INTERACTION SCORES FOR ELECTRONIC COMMUNICATIONS, AND UTILIZATION OF SAME

BACKGROUND

Many platforms exist for enabling users to share various electronic communications with group(s) of other users, such as a group that includes all users of the platform and/or groups that each include a subset of users of the platform. For example, a given user can create a post utilizing a client device, and can submit the post to cause it to be shared with other user(s) of the platform. Various types of posts can be created, such as text-only, image-only, video-only, and/or multimedia posts.

In such platforms, a given user utilizes a client device to access the platform and create posts or other electronic communications for the platform, and/or to view electronic communications that are accessible to the given user. However, a quantity of electronic communications that are available for transmitting for presentation to the given user oftentimes significantly exceeds a desired quantity. For example, thousands of electronic communications can be available for transmitting, but it may be desirable to transmit only a small fraction of those electronic communications in response to a request. For instance, it may be desirable to transmit only a small fraction to conserve network resources, to not overburden hardware resources of the client device, to conform to display constraints of the client device, etc.

SUMMARY

Implementations of this specification are directed to training and/or utilizing a machine learning model to generate request agnostic predicted interaction scores for electronic communications, and to utilization of request agnostic predicted interaction scores in determining whether, and/or how, to provide corresponding electronic communications to a client device in response to a request. The electronic communications can include posts that are shared to a platform (e.g., a social networking platform) by a user through interaction of the user with a client device. The posts can be shared for consumption by one or more other users of the platform through corresponding client devices of the other users. For example, the posts can be shared for potential presentation to all users of the platform, or to subgroup(s) of users of the platform (e.g., contacts/friends of the user).

As used herein, a request agnostic predicted interaction score for an electronic communication provides an indication of quality of the electronic communication. It is "request agnostic" in that its value is generated independent of corresponding request(s) for which it is being utilized in determining whether and/or how to provide the electronic communication in response. For example, a request agnostic predicted interaction score for a given electronic communication can be generated prior to a given request, and generated independent of any content associated with the request. For instance, it can be generated independent of term(s), topic(s), and/or other content of the request (e.g., independent of whether such content matches the given electronic communication), and generated independent of attribute(s) associated with the user and/or the client device associated with the request (e.g., independent of whether such attributes match features indexed with the given electronic communication). As used herein, providing an electronic communication in response to a request can include providing the entirety of the electronic communication, or providing part of the electronic communication (e.g., snippet(s) of the electronic communication)—optionally along with a selectable option (e.g., a hyperlink) to view and/or hear the entirety of the electronic communication.

In many implementations, a request agnostic predicted interaction score for an electronic communication is generated "offline" relative to corresponding request(s) for which it is utilized. That is, the request agnostic predicted interaction score for the electronic communication can be generated prior to the corresponding request(s) even being received. In those implementations, the request agnostic predicted interaction score is pre-indexed with (or otherwise assigned to) the electronic communication. This enables fast and efficient retrieval of the request agnostic predicted interaction score by computing device(s), when the electronic communication is responsive to a request, and fast and efficient utilization of the score in determining whether and/or how to provide the electronic communication in response to the request. This can reduce response time of, and/or computational burden on, computing device(s) that determine which electronic communications are provided in response to a request and/or that determine how those electronic communications are provided (e.g., a presentation order and/or other prominence characteristic(s) of the electronic communications).

Thus, a prior-generated request agnostic predicted interaction score can be utilized in determining whether and/or how to provide the electronic communication in response to a request, which enables computing devices to more quickly and/or more efficiently respond to the request relative to techniques that instead determine a score for an electronic communication only in response to receiving a request. Additionally or alternatively, a greater quantity of electronic communications can be considered for potential provision in response to a request as they all have pre-assigned prior-generated request agnostic predicted interaction scores. For example, with some prior techniques, only a small subset of responsive electronic communications are selected for scoring in response to receiving a request. In the prior techniques, the request responsive scoring can then be utilized in determining which electronic communications to provide in response to the request and/or how to provide the electronic communications. However, with the prior techniques, interaction scores will not be determined for electronic communications that are not in the small subset, which can result in one or more relevant electronic communications not being provided in response to the request. This can result in a poor user experience and can lead to an increased quantity of requests, as user(s) are forced to issue multiple requests in seeking relevant electronic communications. In contrast, implementations disclosed herein enable consideration of request agnostic predicted interaction scores for a greater quantity of (e.g., all of) responsive electronic communications, as the pre-assignment of the request agnostic predicted interaction scores enables computationally efficient consideration of such scores while efficiently responding to the request.

Implementations disclosed herein utilize a trained machine learning model (e.g., a deep neural network model or other machine learning model) in generating request agnostic predicted interaction scores for electronic communications. In some of those implementations, the trained machine learning model is used to process multiple features of an electronic communication to generate one or more predicted outputs. The predicted output(s) are used to generate the request agnostic predicted interaction score, and can directly or indirectly indicate the request agnostic predicted interaction score. In some versions of those implementations, the trained machine learning model can be more complex relative to models utilized in generating scores in response to a request, which can make the trained machine learning model more robust and/or more accurate. For example, the trained machine learning model can be more complex by accepting a greater quantity of features as input (i.e., have an input shape with a greater quantity of dimensions) and/or by having a greater quantity of learned weights (e.g., a "deeper" neural network model with a greater quantity of layers and/or nodes).

In some implementations, the trained machine learning model is trained to enable its use in predicting, based on input features, at least one measure that is indicative of a probability and/or extent of one or more types of future interaction with an electronic communication having the input features. For example, the measure can indicate the probability of the electronic communication being re-shared and/or commented on within a certain time-period (e.g., within the next 2 hours, within the next 24 hours, within the next 2 days). Also, for example, multiple measures can be predicted, with a first measure indicating a likelihood of interaction (e.g., re-sharing, commenting, being "clicked" on, and/or receiving a sentiment input (e.g., a "+1")) within the next 1 hour, a second measure indicating a likelihood of interaction within the next 24 hours, etc. As yet another example, multiple measures can be predicted, with a first measure indicating a likelihood of at least five interactions within a time period, a second measure indicating a likelihood of at least ten interactions within a time period, etc. As yet a further example, a single measure can be predicted, where the single measure indicates a predicted quantity of interactions within a time period. Additional and/or alternative measures can be predicted, such as those described in more detail herein.

The trained machine learning model can be utilized to process multiple input features. Some non-limiting examples of features of an electronic communication that can be processed include features based on: sentiment inputs directed toward the electronic communication (e.g., based on a quantity of "+1 s"; based on a quantity of "+1 s" in the last 12 hours and/or a quantity of "+1 s" in the last 48 hours); time since creation of the given electronic communication (e.g., days, hours, or minutes since creation); time since a last interaction (e.g., any interaction, or a particular type of interaction) with the electronic communication; text of the electronic communication (e.g., one or more terms selected based on TFIDF, a Word2vec embedding (generated utilizing a separate model) of terms of the electronic communication); image(s) and/or video(s) in the electronic communication (e.g., embedding vector(s) of the image(s) and/or video(s), detected object(s) in the image(s) and/or video(s)); re-shares of the electronic communication (e.g., based on a quantity of re-shares; based on a quantity of re-shares in the last 12 hours and/or a quantity of re-shares in the last 48 hours); stream(s) to which the electronic communication is shared and/or re-shared (e.g., feature(s) based on topic(s) of the stream(s)); and/or an author of the electronic communication.

In training the machine learning model, training instances can be generated based on historical states of electronic communications and interactions that occurred following those historical states. For example, training instance input of a training instance can be generated based on the state of a given electronic communication at a given time. For instance, the training instance input can have input features that include features based on: sentiment inputs that had been directed toward the given electronic communication by the given time; time between the given time and creation of the given electronic communication (i.e., an "age" of the electronic communication); time since a last interaction with the given electronic communication; text, video(s), and/or image(s) of the given electronic communication; re-shares of the given electronic communication that had occurred by the given time; stream(s) to which the given electronic communication had been shared by the given time; and/or an author of the given electronic communication. Also, for example, training instance output of the training instance can be generated based on interaction(s) with the given electronic communication that occurred after the given time. For instance, the training instance output can be based on a quantity and/or type(s) of interactions that occurred within twelve hours following the given time. Through training based on a large quantity of such training examples, the machine learning model can be trained to accurately predict, based on input features corresponding to a message, a measure that indicates a quantity and/or type(s) of interactions with the message that will occur within the next twelve hours. Such a measure can then be utilized as the request agnostic predicted interaction score and/or utilized to calculate the request agnostic predicted interaction score (e.g., normalized or otherwise transformed to calculate the request agnostic predicted interaction score).

In many implementations, at least some of the training instances can be generated based on historical states of electronic communications that are pre-interaction electronic communications. For example, a training instance can be generated based on the state of an electronic communication at creation, before that electronic communication has been interacted with by other users. For such training instances, "null" values (or other "special" value(s)) can be utilized for interaction-specific features to indicate that no interactions have yet occurred. For instance, since no sentiment inputs have yet been provided at creation, a "null" value can be utilized for input feature(s) that are based on sentiment inputs that had been directed toward the given electronic communication by the given time. In these and other manners, the machine learning model can be trained to enable accurate prediction of interaction measures for electronic communications that have not yet been interacted with. Such pre-interaction electronic communications are also referenced herein as being in a "zero-state" when they have not yet been interacted with.

In some implementations, a trained machine learning model is utilized to generate an initial request agnostic predicted interaction score for a given electronic communication in response to creation of the given electronic communication. This enables a quality measure, in the form of the initial request agnostic predicted interaction score, to be assigned to the given electronic communication when it is in a zero-state. In some of those implementations, new request agnostic predicted interaction scores can subsequently be generated for the given electronic communication, and assigned to the given electronic communication (e.g., supplanting the initial score or a previously generated new score). In some versions of those implementations, each new request agnostic predicted interaction score is generated in response to occurrence of a rescoring event. The rescoring event can be, a daily or other periodic rescoring that occurs for multiple (e.g. all, or not "recently rescored") electronic communications. The rescoring event can alternatively be the detection of one or more particular types of interactions with the given electronic communication (and optionally at least a threshold quantity of interactions of the particular type(s)), such as a sharing of the given electronic communication, a comment directed to the given electronic communication, and/or an edit of the given electronic communication. Other type(s) of interactions can optionally not constitute a rescoring event (thus not triggering a rescoring), such as a sentiment input (e.g., a "+1") directed toward the given electronic communication. Nonetheless, in a rescoring, input features can be based on interactions that are of such other type(s). In these and other manners, new request agnostic predicted interaction scores are generated only selectively for each of a plurality of electronic communications. Such selective generation can enable the scores for the electronic communications to be kept up to date, while not overburdening computational resources by triggering rescoring in response to each and every interaction.

As mentioned above, request agnostic predicted interaction scores for electronic communications can be utilized in selecting a group of electronic communications to provide in response to a request and/or in determining how the electronic communications of the group should be presented. For example, the request can be provided to a social networking platform, the electronic communications can be posts submitted to the social networking platform, and they can be provided for presentation as a display feed and/or in another manner.

As one example, an electronic communications request for a client device can be received. For instance, the request can be received in response to transmission of the request by the client device. Further, a plurality of electronic communications that are responsive to the request can be identified from a corpus of shared electronic communications. The request agnostic predicted interaction scores pre-assigned to the plurality of electronic communications can be retrieved and utilized in selecting a group of the electronic communications. At least part of each of the electronic communications of the group can then be transmitted to the client device, and the client device can present (audibly and/or graphically) the electronic communications of the group. The group can be, for example, an initial group of the electronic communications to be initially rendered (audibly and/or graphically) by the client device responsive to the request.

In some implementations, the request includes one or more criteria for identifying the plurality of electronic communications that are responsive to the request. For example, the request can include one or more terms and/or an indication of one or more categories, and the plurality of electronic communications that are responsive to the request can be identified based on being indexed by one or more of the terms and/or one or more of the categories. As another example, the request can include, or otherwise be associated with, an identifier of the user of the client device—and the plurality of electronic communications additionally or alternatively identified based on being accessible to the user (e.g., public; or private, but shared with the user).

In some of those implementations, the one or more criteria for the request can be utilized to generate a request specific score, and the request specific score can additionally be utilized in selecting the group of the electronic communications and/or in determining how to present the electronic communications of the group. The request specific score can be dependent on the request. For example, it can be dependent on search term(s) of the request (if any) and/or based on attribute(s) associated with the user and/or the client device associated with the request. For instance, the request specific score for a given electronic communication can be based on term(s) of the request matching term(s) indexed with the given electronic communication and/or can be based on attribute(s) associated with the request being indexed (or otherwise associated) with the given electronic communication.

As one example, the request agnostic predicted interaction scores can be utilized to select the group, and the electronic communications of the group can be ranked based on the request specific scores—and optionally based on the request agnostic predicted interaction scores. As another example, the request agnostic predicted interaction scores can be utilized to select an initial group that is a subset of the responsive electronic communications, and the selected group can be a further subset of that subset, and can be selected based on the request specific scores, and optionally the request agnostic predicted interaction scores. For instance, if 1,000 electronic communications are responsive, a subset of 100 can be selected based on having the best request agnostic predicted interaction scores. A further subset of 20 can be selected from the subset based on the request specific scores alone—or based on both the request specific scores and the request agnostic predicted interaction scores. As yet another example, the request agnostic predicted interaction scores can be utilized to select the group, and the selected group can be ranked based on the request specific scores, and optionally the request agnostic predicted interaction scores. For instance, if 1,000 electronic communications are responsive, a subset of 20 can be selected based on having the best request agnostic predicted interaction scores, then ranked based on the request specific scores, and optionally the request agnostic predicted interaction scores.

Various examples provided above and elsewhere herein describe electronic communications that are posts. However, in various implementations electronic communications additionally or alternatively include other types of electronic communications such as messages (e.g., chat messages, SMS messages, and/or text messages), emails, etc. In some of those various implementations, each of one or more scoring model(s) described herein can optionally be tailored to one or more type(s) of electronic communications (e.g., one tailored to posts, one tailored to SMS messages and text messages, one tailored to chat messages), and corresponding scoring model(s) utilized for corresponding type(s) of electronic communications. In some of those various implementations, the features that are applied as input in training and/or utilizing the scoring model(s) for such other type(s) of electronic communications can optionally be tailored to the type(s) for which the scoring model(s) are trained and utilized. Such features can include all or subsets of features described herein, as well as additional and/or alternative features.

The above description is provided as an overview of various implementations. The below description provides additional detail for those implementations, and for various additional implementations.

In some implementations, a method implemented by one or more processors is provided that includes, for each electronic communication of a corpus of shared electronic communications: determining a set of features based at least in part on content of the electronic communication, generating a request agnostic predicted interaction score for the electronic communication based on processing the set of features using a trained machine learning model, and assigning, in one or more databases, the request agnostic predicted interaction score to the electronic communication. The method further includes: receiving an electronic communications request for a client device, identifying a plurality of the electronic communications of the corpus that are responsive to the electronic communications request, and retrieving, from the one or more databases, the request agnostic predicted interaction scores assigned to the identified plurality of the electronic communications. The method further includes selecting a group of the identified plurality of the electronic communications based at least in part on the request agnostic predicted interaction scores, and transmitting, to the client device, at least part of each of the identified plurality of the electronic communications of the group.

These and other implementations may include one or more of the following features.

In some implementations, the method further includes generating a request specific score for each of the plurality of the electronic communications of the corpus that are responsive to the electronic communications request. In some of those implementations, selecting the group of the identified plurality of the electronic communications is further based on the request specific scores for the plurality of the electronic communications of the corpus that are responsive to the electronic communications request. In some versions of those implementations, generating each of the request specific scores for the candidate electronic communication is based on attributes associated the client device or a user of the client device and/or one or more terms of the request. For example, generating each of the request specific scores can be based on the one or more terms included in the request, and generating each of the request specific scores can be based on conformance between the one or more terms and the corresponding candidate electronic communication.

In some implementations, the method further includes generating a request specific score for each of the plurality of the identified plurality of the electronic communications of the group, and ranking the identified plurality of the electronic communications of the group based at least in part on the request specific scores and the request agnostic predicted interaction scores. In some of those implementations, transmitting, to the client device, content from each of the identified plurality of the electronic communications of the group includes transmitting the content with presentation characteristics that are based on the ranking.

In some implementations, determining the set of features for a given electronic communication of the electronic communications includes determining at least one sentiment feature based on a plurality of sentiment inputs directed toward the given electronic communication. In some of those implementations, determining the at least one sentiment feature based on a plurality of sentiment inputs directed toward the electronic communication includes: determining a first sentiment feature based on a quantity of the sentiment inputs directed toward the given electronic communication in a first temporal period, and determining a second sentiment feature based on an additional quantity of the sentiment inputs directed toward the given electronic communication in a second temporal period. In some versions of those implementations, the second temporal period encompasses a plurality of second temporal period times that are more distant to a current time than are any first temporal period times of the first temporal period. The second temporal period can optionally overlap the first temporal period.

In some implementations, determining the set of features for a given electronic communication of the electronic communications includes one, multiple, or all of: determining at least one sentiment feature based on a plurality of sentiment inputs directed toward the electronic communication; determining at least one age feature based on time since creation of the given electronic communication; determining at least one textual content feature based on text of the electronic communication; determining at least one sharing feature based on a quantity of shares of the electronic communication; determining at least one stream collection feature based on a stream to which the electronic communication is shared or re-shared; and determining at least one author feature based on an author of the electronic communication.

In some implementations, the trained machine learning model is trained to predict at least one likelihood of engagement with a corresponding electronic communication based on the corresponding set of features for the corresponding electronic communication that are processed by the trained machine learning model. In some of those implementations, the at least one likelihood of engagement includes a likelihood of engagement within a temporal period and/or includes a likelihood of at least a threshold quantity of engagements within a temporal period.

In some implementations, a method implemented by one or more processors is provided that includes, in response to creation of a shared electronic communication by a creator via a client device: determining a first set of features based at least in part on content of the electronic communication, processing the first set of features using a trained machine learning model to generate a request agnostic predicted interaction score for the electronic communication, and assigning, in one or more databases, the request agnostic predicted interaction score to the electronic communication. The method further includes, subsequent to assigning the request agnostic predicted interaction score to the electronic communication: using the request agnostic interaction predicted score in determining whether to transmit, to one or more additional client devices of one or more additional users, at least part of the electronic communication in response to one or more corresponding requests. The method further includes, subsequent to using the request agnostic interaction score in determining whether to transmit at least part of the electronic communication: detecting occurrence of a rescoring interaction with the electronic communication. The method further includes, in response to detecting the occurrence of the rescoring interaction: determining a second set of features based at least in part on the content of the electronic communication, and based on one or more properties of the rescoring interaction; processing the second set of features using the trained machine learning model to generate a new request agnostic predicted interaction score for the electronic communication; and assigning, in one or more of the databases, the new request agnostic predicted interaction score to the electronic communication. The method further includes, subsequent to assigning the new request agnostic predicted interaction score to the electronic communication: using the new request agnostic predicted interaction score in determining whether to transmit, to one or more further client devices of one or more further users, at least part of the electronic communication in response to one or more corresponding further requests.

These and other implementations may include one or more of the following features.

In some implementations, the method further includes determining one or more additional interactions with the electronic communication that occurred between the creation of the electronic communication and the rescoring interaction, where the one or more additional interactions do not trigger rescoring of the electronic communication. In those implementations, determining the second set of features is further based on the one or more additional interactions. In some of those implementations, the one or more additional interactions include at least one of: a viewing of the electronic communication and a sentiment input directed toward the electronic communication. In some versions of those implementations, the rescoring interaction is a re-sharing of the electronic communication in response to user interface input from a given user that is not the creator, or is an edit of the electronic communication in response to user interface input from the creator.

In some implementations, assigning the new request agnostic predicted interaction score to the electronic communication includes supplanting the request agnostic predicted interaction score with the new request agnostic predicted interaction score.

In some implementations, the first set of features include a null or special value for an interaction feature, and the second set of features include a particular value for the interaction feature, where the particular value is determined based at least in part on the rescoring interaction.

In some implementations, the rescoring interaction is a sharing of the electronic communication in response to user interface input from a given user that is not the creator, or is an edit of the electronic communication in response to user interface input from the creator.

In some implementations, the electronic communication is a post.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Implementations of this specification are directed to training and/or utilizing a scoring model, that is a machine learning model, to generate request agnostic predicted interaction scores for electronic communications. Implementations additionally and/or alternatively relate to utilization of generated request agnostic predicted interaction scores in determining whether, and/or how, to provide corresponding electronic communications to a client device in response to a request.

Figure 6A:
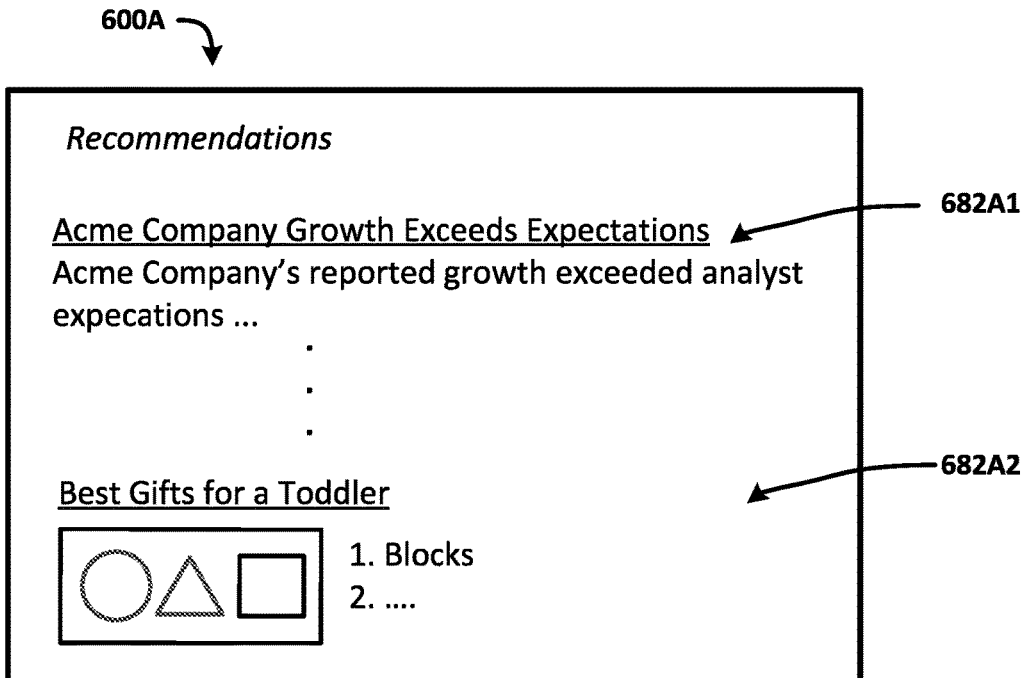
FIG. 6A and FIG. 6B each illustrate an example graphical user interface for presenting at least part of electronic communications in response to a request.
Figure 6B:
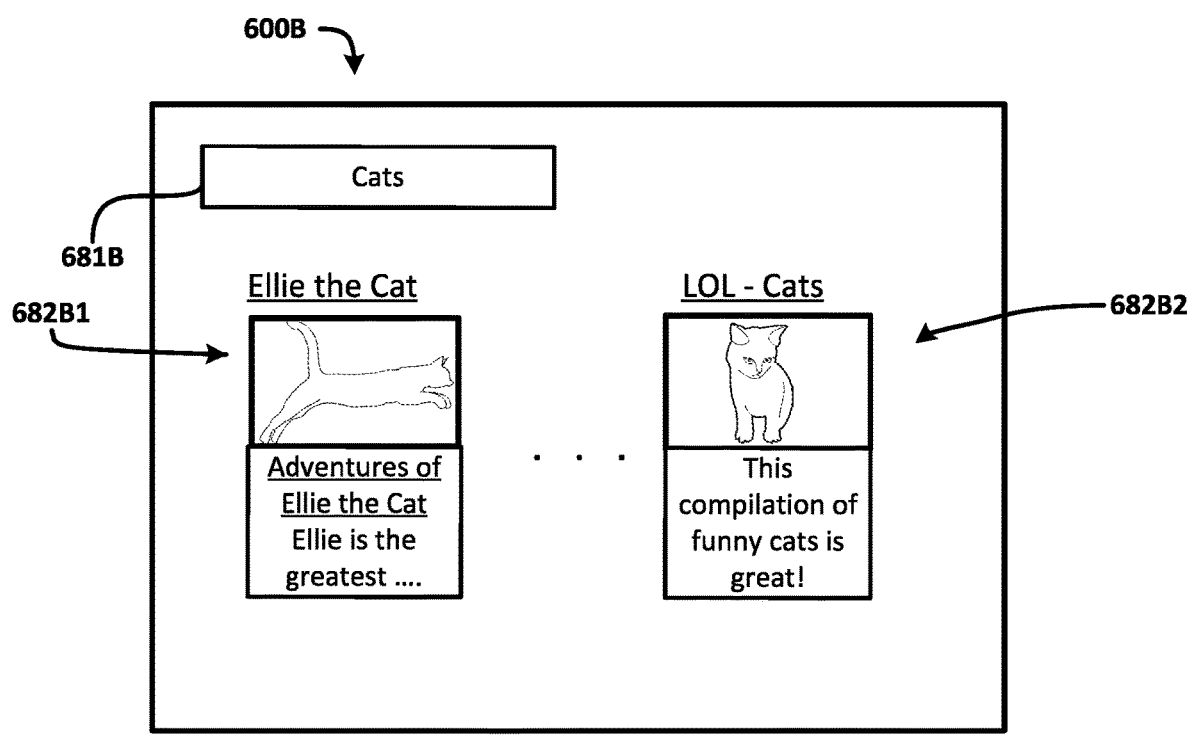
Figure 7:
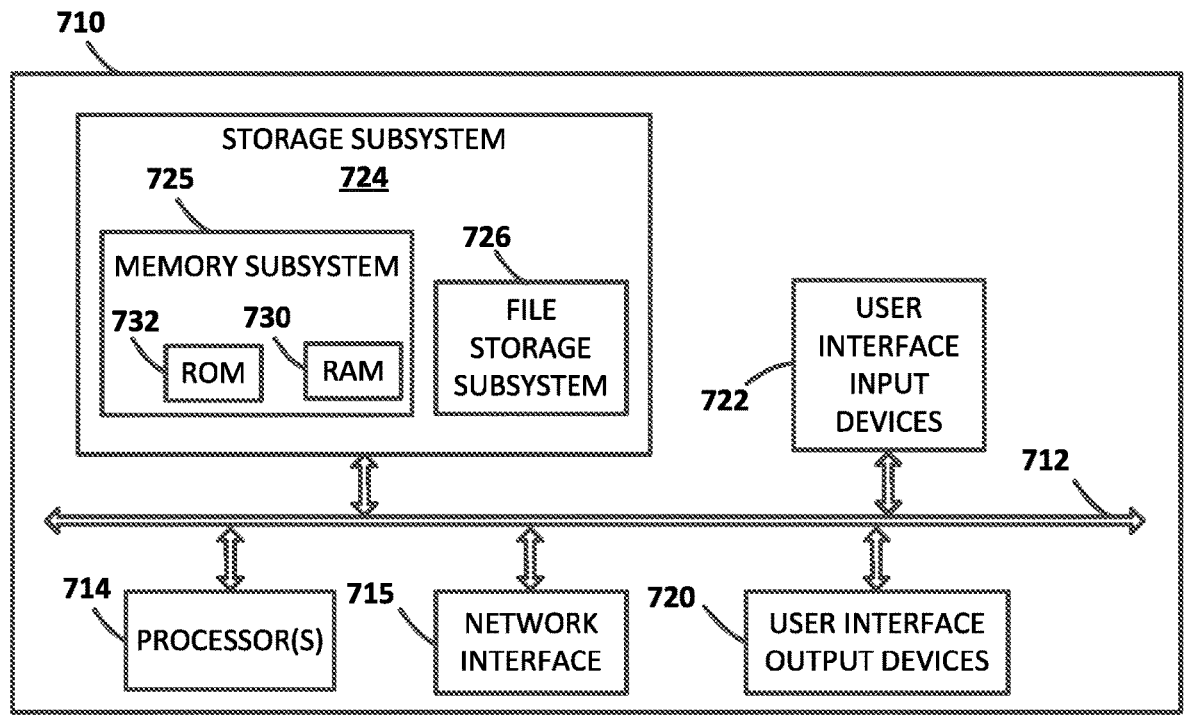
FIG. 7 illustrates an example architecture of a computing device.

Implementations of training such a scoring learning model are described below with references FIGS. 1A-1C, and FIG. 5. Implementations of generating request agnostic predicted interaction measures for electronic communications utilizing such a scoring model, and assigning the scores to the electronic communications, are described below with reference to FIGS. 2 and 3. Implementations of utilizing generated request agnostic predicted interaction measures in determining whether and/or how to provide electronic communications in response to a request are described below with reference to FIGS. 2 and 4. FIGS. 6A and 6B illustrate example graphical interfaces for presenting at least part of electronic communications in response to a request, and FIG. 7 illustrates an example architecture of a computing device that can be utilized in performance of all, or aspects of, various techniques described herein.

The electronic communications described herein can include posts that are shared to a platform (e.g., a social networking platform) by a user through interaction of the user with a client device. The posts can be shared for consumption by one or more other users of the platform through corresponding client devices of the other users. For example, the posts can be shared for potential presentation to all users of the platform, or to subgroup(s) of users of the platform (e.g., contacts/friends of the user).

Figure 1A:
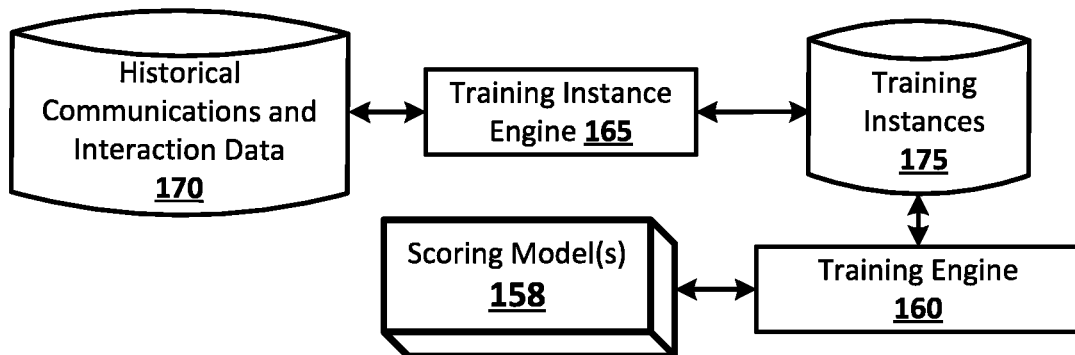
FIG. 1A is a block diagram of an example environment in which one or more scoring models can be trained, where the scoring model(s) are each a machine learning model.

Turning now to FIG. 1A, a block diagram is illustrated of an example environment in which one or more scoring models 158 can be trained. Although not illustrated in FIG. 1A, the example environment can include one or more communication networks that facilitates communication between various components and/or subcomponents in the environment (e.g., via network interfaces of those components). Such communication network(s) may include a wide area network (WAN) such as the Internet, one or more intranets, and/or one or more bus subsystems—and may optionally utilize one or more standard communications technologies, protocols, and/or inter-process communication techniques.

In FIG. 1A, a training instance engine 165 accesses historical communications and interaction data 170 to generate training instances 175. The historical communications and interaction data 170 can include one or more databases that store information related to electronic communications, such as posts shared to a social networking platform. For example, the historical communications and interaction data 170 can store, for each of a plurality of shared electronic communications, some or all of the content of the electronic communication, and temporal indications of historical interactions with the electronic communication. For instance, for an electronic communication, at least some of the content of the electronic communication can be stored (e.g., text and/or image(s), and/or a summary thereof)—as well as indications of interaction(s) with the electronic communication that occurred, along with timestamps for those interactions. An interaction with an electronic communication can include, for example, editing the electronic communication (e.g., an edit by the author), electronically re-sharing the electronic communication (e.g., a first non-author user sharing the electronic resource with one or more additional users via a social networking platform), viewing and/or listening to the electronic communication via a computing device, commenting on the electronic communication (e.g., a non-author user posting a comment that can be subsequently viewed in combination with the electronic communication), and/or a sentiment input directed to the electronic communication (e.g., a "thumbs-up" or "thumbs-down", a "+1").

The training instance engine 165 generates the training instances 175 based on historical states of electronic communications and interactions that occurred following those historical states, as indicated by historical communications and interaction data 170. Each of the training instances 175 is generated based on a corresponding electronic communication, and a single electronic communication can optionally be utilized to generate multiple training instances. For example, the training instance engine 165 can generate a first training instance, of training instances 175, with training instance input that is based on content of an electronic communication and interaction(s) with the electronic communication (if any) that have occurred by a given time, and training instance output that is based on interaction(s) that occur following the given time. Content and/or interactions relative to a given time can be determined based on, for example, timestamp data included in historical communications and interaction data 170. Also, for example, a second training instance, of training instances 175, with training instance input that is based on content of the same electronic communication and interaction(s) with the electronic communication (if any) that have occurred by an additional given time, and training instance output that is based on interaction(s) that occur following the additional given time. The input and output dimensions of generated training instances will be dependent on input and output dimensions of the scoring model(s) 158 to be trained utilizing the training instances.

The training engine 160 trains each of one or more scoring model(s) 158 utilizing the training instances 175. For example, the training engine 160 can apply a training instance input of a training instance as input to one of the scoring model(s) 158, process the input utilizing the current weights of the one of the scoring model(s) 158 to generate a predicted output, determine an error based on comparison of the predicted output to the training instance output of the training instance, and update the weights of the one of the scoring model(s) 158 based on the determined error. For example, the training engine 160 can backpropagate the error (and optionally one or more additional errors in a batch technique) over the one of the scoring model(s) 158 in updating the weights. Through a large quantity of such iterations utilizing a large quantity of training instances 175, the training engine 160 can train the one of the scoring model(s) 158 to generate, based on input features indicative of a current state of an electronic communication, a prediction that indicates interaction(s) that will occur within one or more time periods.

Figure 1B:
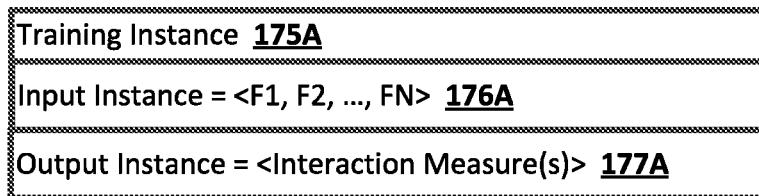
FIG. 1B illustrates an example of a training instance that can be utilized in training the scoring model(s) of FIG. 1A.

Turning now to FIG. 1B, an example of a training instance 175A, of training instances 175, is provided. The training instance 175A is one example of a training instance that can be utilized to train one or more of the scoring model(s) 158. The training instance 175A is generated based on a given electronic communication, and associated interaction data of the given electronic communication, of historical communications and interaction data 170. The training instance 175A includes an input instance 176A and an output instance 177A.

The input instance 176A includes a plurality of input features F1-FN that each indicate a feature of the given electronic communication at a given time. For example, the input features F1-FN can include input features based on: sentiment inputs that had been directed toward the given electronic communication by the given time; time between the given time and creation of the given electronic communication (i.e., an "age" of the electronic communication); time since a last interaction with the given electronic communication; text, video(s), and/or image(s) of the given electronic communication; re-shares of the given electronic communication that had occurred by the given time; stream(s) to which the given electronic communication had been shared and/or re-shared by the given time; dismissals of the given electronic communication that had occurred by the given time (e.g., "swiping away", "muting", or otherwise dismissing the communication), selections of the given electronic communication that had occurred by the given time (e.g., a selection to "expand" a summary of an electronic communication to a full view of the electronic communication), and/or an author of the given electronic communication (e.g., an identifier of the author, a quantity of followers of the author, and/or a reputation score for the author). For instance: feature F1 can indicate an age of the electronic communication; feature F2 can indicate a quantity of "+1 s" that have been directed to the electronic communication in the last 12 hours (relative to the given time); feature F3 can indicate a quantity of "+1 s" that have been directed to the electronic communication in the last 48 hours (relative to the given time); feature F4 can indicate the number of re-shares of the electronic communication since creation; feature F5 can be one or more terms of the electronic communication, or a Word2Vec embedding or other embedding of terms of the electronic communication; feature F6 can indicate object(s) detected in image(s) of the electronic communication (if any); feature F7 can indicate a quantity of comments directed to the electronic communication since creation and/or properties of those comments; feature F8 can indicate a stream to which the electronic communication was originally shared; and feature FN can indicate an author of the electronic communication (e.g., a unique identifier of the author, or feature(s) of the author such as a geographic area associated with the author, a popularity of the author, a frequency of posting by the author). Additional and/or alternative input features may be included in the training instance 175A.

The output instance 177A includes one or more interaction measures generated based on interaction(s) with the given electronic communication that occurred after the given time. For example, the interaction measure(s) can be generated based on a quantity and/or type(s) of interactions that occurred within twelve hours following the given time. As one example, one or more of the interaction measure(s) can indicate whether the electronic communication was re-shared and/or commented on within a corresponding time-period following the given time (e.g., within the next 2 hours, within the next 24 hours, within the next 2 days). For instance, multiple interaction measures can be provided, with a first measure indicating whether the given electronic communication was interacted with (e.g., re-sharing, commenting, being "clicked" on, and/or receiving a sentiment input (e.g., a "+1")) within 1 hour following the given time, a second measure indicating whether the given electronic communication was interacted within 24 hours following the given time, etc. As yet another example, multiple interaction measures can be provided, with a first measure indicating whether at least five interactions occurred within a time period following the given time, a second measure indicating whether at least ten interactions occurred within a time period following the given time, etc. As yet a further example, a single interaction measure can be provided, where the single measure indicates a quantity of interactions that occurred within a time period following the given time. Additional and/or alternative interaction measures can be predicted, such as those described in more detail herein.

It is understood that the input features and the output feature(s) utilized will be dependent on the input and output formats of the scoring model to be trained. Further, it is understood that in some implementations multiple scoring models can be trained, and different training instances can be generated for each, where the training instances differ in the input format and/or output format. As one non-limiting example, a first scoring model can be trained based on training instances that have input instances that are each indicative of certain features of a corresponding electronic communication at a corresponding time, and that have an output instances that each indicate whether certain type(s) of interaction were directed to the corresponding electronic communication within 12 hours following the corresponding time; and a second scoring model can be trained based on training instances that have input instances that are each indicative of certain features of a corresponding electronic communication at a corresponding time, and that have an output instances that each indicate a quantity of certain type(s) of interaction directed to the corresponding electronic communication within 24 hours following the corresponding time, and a quantity of certain type(s) of interaction directed to the corresponding electronic communication within 72 hours following the corresponding time. When multiple scoring models are trained, they can both be utilized in generating a request agnostic predicted interaction measure for an electronic communication. For example, the request agnostic predicted interaction measure can be a function of outputs from both trained scoring models, or the outputs from both trained scoring models can be considered separately (without necessarily determining a measure that is a function of both outputs).

In some of those implementations, for each of a plurality of communications, multiple request agnostic predicted interaction measures can be generated, with each of the request agnostic predicted interaction measures being generated based on a corresponding one of the multiple scoring models. The request agnostic predicted interaction measures for each communication can each be indexed, or otherwise stored in association with, the communication. When determining whether, and/or how, to provide a given electronic communication in response to a request, multiple of the request agnostic predicted interaction measures can be considered. For example, they can be combined and considered, or considered separately. For instance, if the given electronic communication is indexed with a first measure based on output from a first scoring model and a second measure based on output from a second scoring model, the given electronic communication can be provided in response to a request based on the first measure satisfying a first threshold and based on the second measure satisfying a second threshold (that may optionally differ from the first threshold).

Figure 1C:
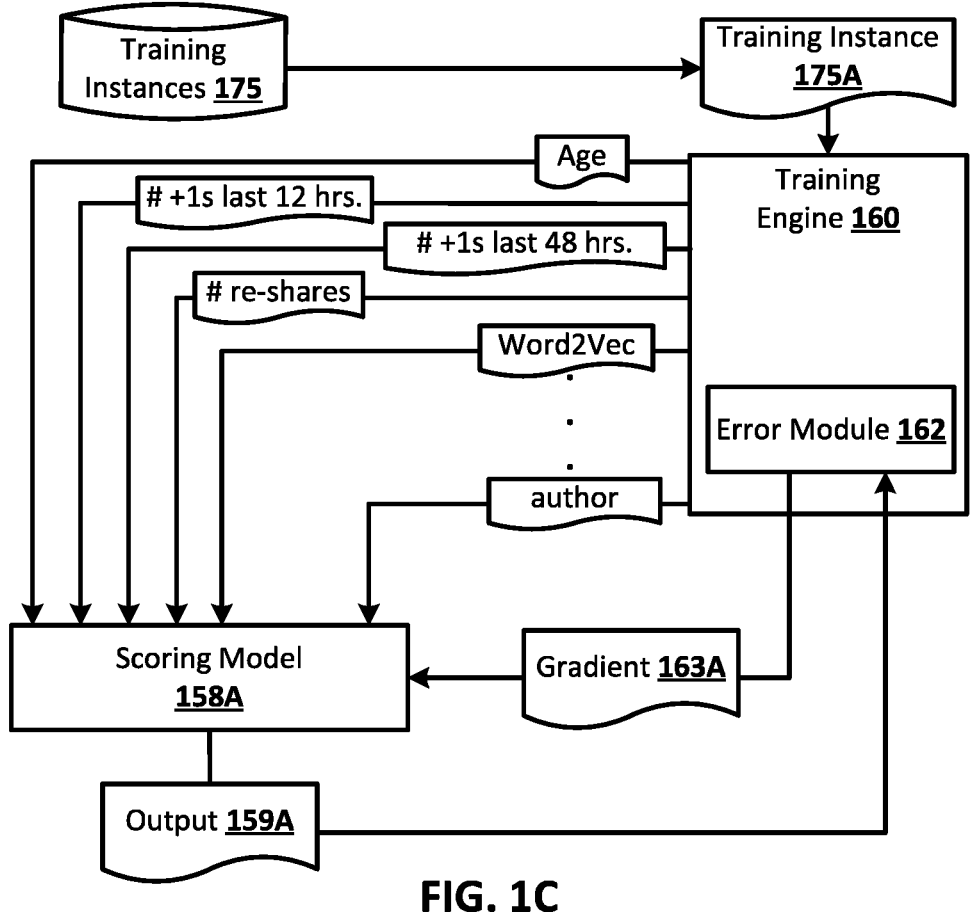
FIG. 1C illustrates an example of training one of the scoring models of FIG. 1A utilizing the training instance of FIG. 1B.

Turning now to FIG. 1C, an example is illustrated of training one of the scoring models 158A, of scoring model(s) 158, utilizing the training instance 175A of FIG. 1B. In some implementations, the scoring model 158A is a neural network model, such as a feed-forward neural network model including one or more hidden layers and downstream affine layer(s). The input dimensions of the scoring model 158A match the input dimensions of the input instance 176A, and the output dimensions match the output dimensions of the output instance 177A.

In FIG. 1C, the training engine 160 retrieves the training instance 175A from training instances 175, which can be stored in one or more databases. The training engine 160 applies, as input to the scoring model 158, the input features of the input instance 176A of training instance 175A. For example, as illustrated, the training engine 160 can apply input features that include input features indicative of age of a given electronic communication relative to a given time, quantity of "+1 s" of the given electronic communication in the last 12 hours relative to the given time, quantity of "+1 s" of the given electronic communication in the last 48 hours relative to the given time, quantity of re-shares given electronic communication since creation, a Word2Vec embedding of text of the given electronic communication, and an author of the given electronic communication.

The training engine 160 generates, based on processing of the input instance 176A over the scoring model 158A, and utilizing the current weights of the scoring model 158A (i.e., the weights based on the training thus far), a predicted output 159A. As one non-limiting example, the predicted output 159A can be a single value from 0 to 1, where the value indicates a predicted probability that the given electronic communication will have at least one interaction, of one or more type(s) of interaction, within the next X hours.

The error module 162 of the training engine 160 generates a gradient 163A based on comparison of the output 159A to the output instance 177A and updates the scoring model 158A based on the gradient 163A. For example, the error module 162 can backpropagate the gradient 163A over the layers of the scoring model 158A to thereby update the weights of the scoring model 158A.

Although FIG. 1C is illustrated with respect to a single training instance, it is understood that during training of the scoring model 158A a large quantity of training instances will be utilized in training the scoring model 158A. For example, training of the scoring model 158A can be based on other training instances 175. Also, although FIG. 1C is described with respect to a non-batch learning technique, batch learning may additionally and/or alternatively be utilized.

Figure 2:
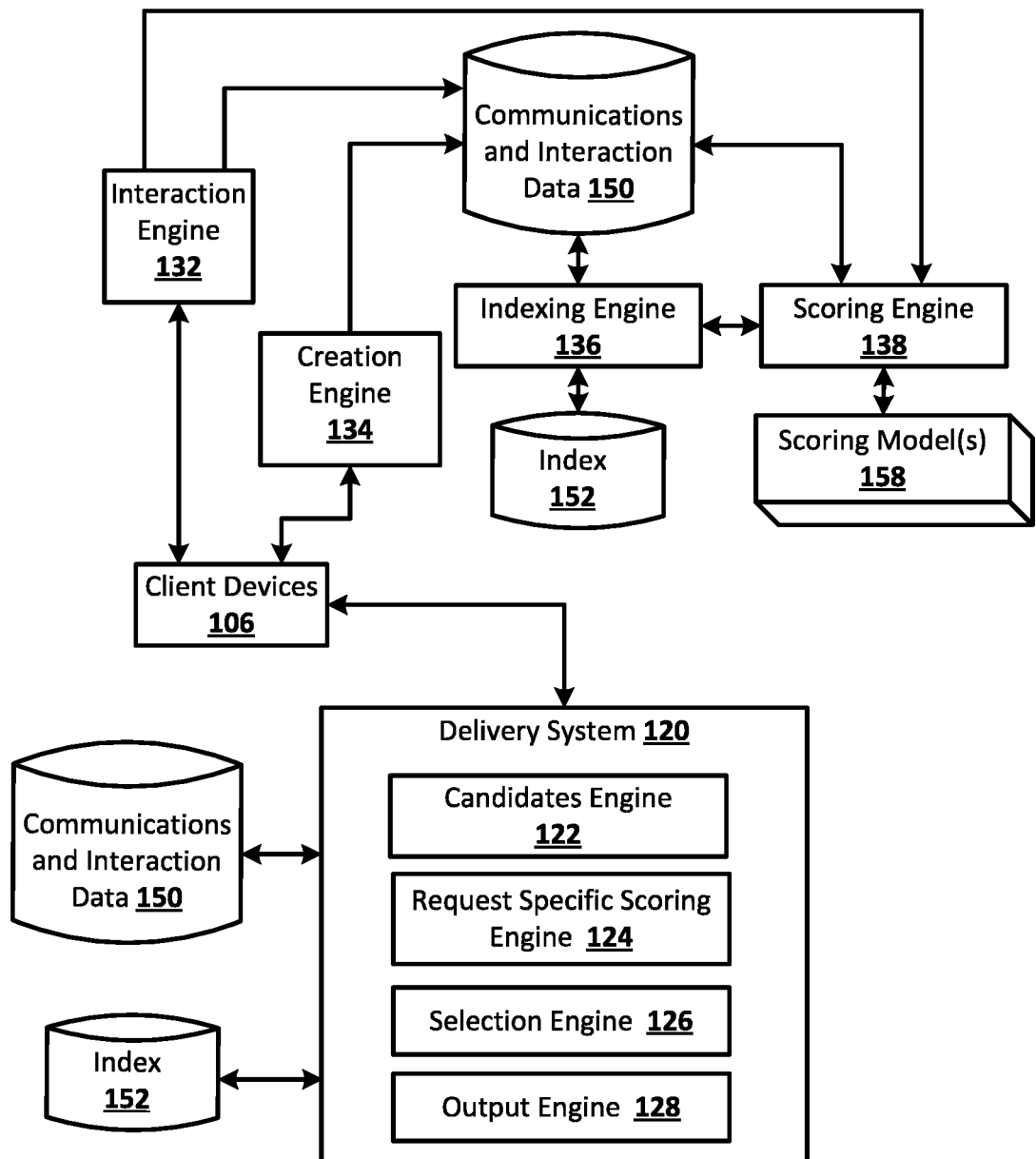
FIG. 2 is a block diagram of an example environment in which request agnostic predicted interaction scores can be generated for electronic communications, and utilized in determining whether and/or how to provide electronic communications in response to a request.

Turning now to FIG. 2, a block diagram is illustrated of an example environment in which request agnostic predicted interaction scores can be generated for electronic communications, and utilized in determining whether and/or how to provide electronic communications in response to a request.

Although not illustrated in FIG. 2, the example environment can include one or more communication networks that facilitates communication between various components and/or subcomponents in the environment (e.g., via network interfaces of those components). Such communication network(s) may include a WAN, one or more intranets, and/or one or more bus subsystems.

FIG. 2 includes a plurality of client devices 106 of a plurality of different users. Client devices 106 can include, for example, smart phones, laptops, desktops, tablets, voice-only computing devices, automotive computing devices, wearable computing devices (e.g., a smart watch, smart glasses), etc. The client devices 106 can interact with a creation engine 134 of a platform (e.g., a social networking platform) to generate shared electronic communications (e.g., posts) for sharing with one or more users of the platform. The client devices 106 can interact with applications that are specific to the platform, a general browser application, and/or other application(s) in generating electronic communications for the platform. In generating an electronic communication, a user can utilize a corresponding client device to specify content (e.g., text, image(s), hyperlink(s), video(s)) to be included in the electronic communication, to specify stream(s) to which the electronic communication is to be made available, to specify group(s) of users to which the electronic communication is to be made available, etc.

The creation engine 134 stores created electronic communications in the communications and interaction data database 150. The indexing engine 136 maintains an index 152 of the electronic communications of communications and interaction data database 150. The index 152 can include a forward index and/or an inverted index, and the indexing engine 136 can optionally index each of the electronic communications with one or more features of the electronic communications, such as keywords, topics, image(s) contained in the electronic communications, stream(s) to which the electronic communications are published, interaction data for the electronic communications, etc.

The indexing engine 136 can also include, in the index, one or more request agnostic predicted interaction scores for each of the electronic communications. The request agnostic predicted interaction score(s) for an electronic communication can be generated by the scoring engine 138 and assigned, by the indexing engine 136, to an identifier of the post in the index 152.

In generating the request agnostic predicted interaction score(s) for each of the electronic communications, the scoring engine 138 utilizes one or more scoring model(s) 158 that have been trained according to techniques described herein. In some implementations, the scoring engine 138 generates an initial request agnostic predicted interaction score for each electronic communication in response to creation of the electronic communication. This enables a quality measure, in the form of the initial request agnostic predicted score, to be assigned to each electronic communication when it is in a zero-state.

As one example, the scoring engine 138 can process, over at least one of the trained scoring models 158, a first set of features for the electronic communication, to generate a predicted output over the scoring model. The scoring engine 138 can utilize the predicted output in generating the initial request agnostic predicted interaction score (e.g., the predicted output can be utilized directly as the score, or can be further processed in generating the score). The first set of features can include, for example, features based on: the content of the electronic communication, the author of the electronic communication, stream(s) to which the electronic communication is shared, group(s) of users to which the electronic communication is initially shared, etc. The first set of features can further include null and/or special values for interaction features, sine no interactions will have occurred upon initial creation of the electronic communication. In some implementations, the scoring engine 138 generates an initial request agnostic predicted interaction score for an electronic communication in response to a signal from creation engine 134 that indicates creation of the electronic communication. In some implementations, the scoring engine 138 additionally or alternatively generates an initial request agnostic predicted interaction score for an electronic communication in response to detecting creation of an entry for the electronic communication in communications and interaction data database 150 and/or in index 152.

In some of those implementations, the scoring engine 138 additionally or alternatively generates new request agnostic predicted interaction scores for an electronic communication in response to a rescoring event. In some versions of those implementations, each new request agnostic predicted interaction score is generated in response to occurrence of a rescoring event. The rescoring event can be, a daily or other periodic (or non-periodic) rescoring that occurs for multiple (e.g. all, or any not "recently rescored") electronic communications. The rescoring event can alternatively be the detection of one or more particular types of interactions with the given electronic communication (and optionally at least a threshold quantity of interactions of the particular type(s)), such as a sharing of the given electronic communication, a comment directed to the given electronic communication, and/or an edit of the given electronic communication. Other type(s) of interactions can optionally not constitute a rescoring event (thus not triggering a rescoring), such as a sentiment input (e.g., a "+1") directed toward the given electronic communication. Nonetheless, in a rescoring of a given electronic communication, the scoring engine 138 can utilize input features that are based on interactions that are of such other type(s). In these and other manners, the scoring engine 138 generates only selectively for each of a plurality of electronic communications. Such selective generation can enable the scores for the electronic communications to be kept up to date, while not overburdening computational resources by triggering rescoring in response to each and every interaction.

A generated new request agnostic predicted interaction score for an electronic communication can be provided by the scoring engine 138 to the indexing engine 136, and assigned, by the indexing engine 136, to an identifier of the post in the index 152. In some implementations, the indexing engine 136 supplants any prior request agnostic predicted interaction score for the electronic communication, with the new request agnostic predicted interaction score. For example, the indexing engine 136 can overwrite, in the index 152, a most recently assigned request agnostic predicted interaction score, with a newly generated request agnostic predicted interaction score. In some alternative implementations, the indexing engine 136 maintains multiple request agnostic predicted interaction scores for an electronic communication in the index 152, and/or averages (or otherwise combines) a new request agnostic predicted interaction score with past request agnostic predicted interaction score(s)—and assigns the averaged (or otherwise combined) score to the electronic communication in the index 152.

The interaction engine 132 detects interactions with shared posts, and stores data indicating of the interactions in communications and interaction data 150. Such stored data can be utilized by scoring engine 138 in generating request agnostic predicted interaction scores. As one example, the interaction engine 132 can detect a re-share, a comment directed to, a viewing of, and/or other interaction with a given post that occurs via one or more interactions of a corresponding user via a corresponding one of the client devices 106. In some implementations, in response to detecting an interaction of a certain type with a given post, the interaction engine 132 transmits data to scoring engine 138 that identifies that post, and that causes the scoring engine 138 to generate a new request agnostic predicted interaction score for that post. In some implementations, the scoring engine 138 additionally or alternatively generates a new request agnostic predicted interaction score for an electronic communication in response to detecting creation and/or updating of interaction measure(s) for the electronic communication, in communications and interaction data database 150 and/or in index 152.

The delivery system 120 utilizes request agnostic predicted interaction scores for electronic communications in responding to request for electronic communications from the client devices 106. For example, the delivery system 120 can utilize the request agnostic predicted interaction scores in selecting a group of electronic communications to provide in response to a request and/or in determining how the electronic communications of the group should be presented.

In various implementations, the delivery system 120 can include a candidates engine 122, a request specific scoring engine 124, a selection engine 126, and an output engine 128.

The candidates engine 122 can process a received request and identify a plurality of electronic communications that are responsive to the request. The request can be received in response to transmission of the request by one of the client devices 106, and the candidates engine 122 can identify a plurality of electronic communications, of the communications and interaction data database 150, that are responsive to the request—and can optionally utilize the index 152 in the identifying. In some implementations, the request includes one or more criteria for identifying the plurality of electronic communications that are responsive to the request. For example, the request can include one or more terms and/or an indication of one or more categories, and the candidates engine 122 can identify the plurality of electronic communications that are responsive to the request based on those electronic communications being indexed, in the index 152, by one or more of the terms and/or one or more of the categories. As another example, the request can include, or otherwise be associated with, an identifier of the user of the client device—and the candidates engine 122 can identify the plurality of electronic communications additionally or alternatively based on those communications being indicated (in database 150 and/or index 152) as being accessible to the user (e.g., public; or private, but shared with the user).

The selection engine 126 selects a group of the identified plurality of electronic communications, based at least in part on the request agnostic predicted interaction scores pre-assigned to the plurality of electronic communications in the index 152. For example, the selection engine 126 can retrieve, from the index 152, the request agnostic predicted interaction scores for all of the identified plurality of electronic communications, and utilize those scores in selecting a group of the electronic communications.

In some implementations, the selection engine 126 selects the group utilizing only the request agnostic predicted interaction scores. In some implementations, the selection engine 126 also utilizes request specific scores for one or more of the identified electronic communications in selecting the group, and/or in determining how to present the electronic communications of the group.

The request specific scores can be dependent on a request, and the request specific scoring engine 124 can be utilized to generate such request specific scores. In some implementations, the request specific scoring engine 124 utilizes one or more criteria for a request in generating the request specific scores, such as search term(s) of the request (if any) and/or attribute(s) associated with the user and/or the client device associated with the request. For example, the request specific scoring engine 124 can generate a request specific score for a given electronic communication based on how many and/or which term(s) of the request match term(s) indexed with the given electronic communication and/or based on attribute(s) associated with the request being indexed (or otherwise associated) with the given electronic communication.

In some implementations, the selection engine 126 utilizes the request agnostic predicted interaction scores to select the group, and the selection engine 126 ranks the electronic communications of the group based on the request specific scores—and optionally based on the request agnostic predicted interaction scores. In some implementations, the selection engine 126 utilizes the request agnostic predicted interaction measures to select an initial group that is a subset of the responsive electronic communications, and then selects the group (which is a further subset of that subset) based on the request specific scores, and optionally the request agnostic predicted interaction scores. In some implementations, the selection engine 126 utilizes the request agnostic predicted interaction scores to select the group, and ranks the selected group based on the request specific scores, and optionally the request agnostic predicted interaction scores.

The output engine 128 transmits, in response to a request, at least part of each of the electronic communications of the group selected by the selection engine 126. The output engine 128 transmits the electronic communications of the group to the client device that submitted the request, which causes the client device to present (audibly and/or graphically) the electronic communications of the group.

Figure 3:
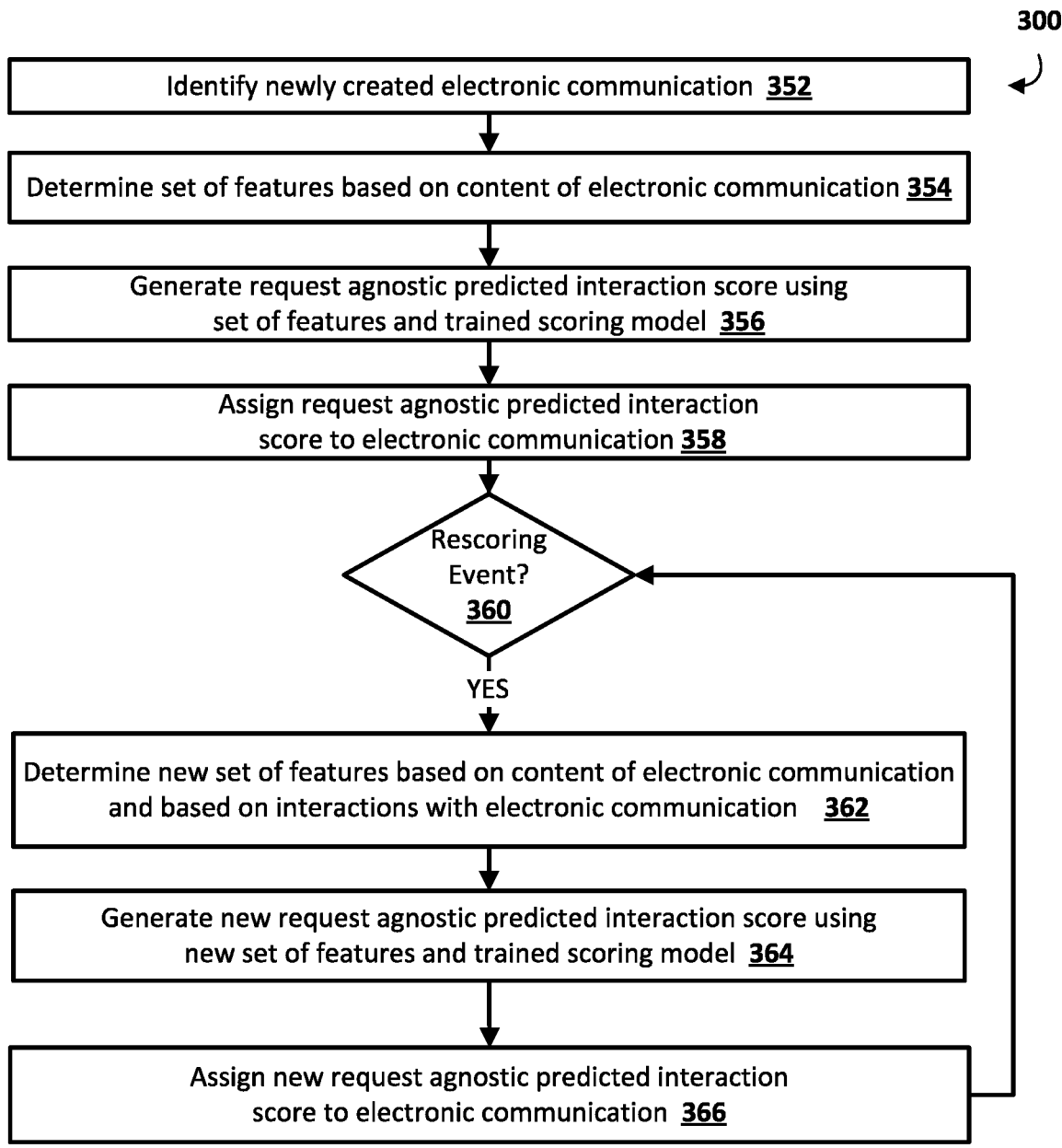
FIG. 3 is a flowchart illustrating a method of generating request agnostic predicted interaction scores for an electronic communication, and assigning the scores to the electronic communication, according to various implementations disclosed herein.

FIG. 3 is a flowchart illustrating a method 300 of generating request agnostic predicted interaction scores for an electronic communication, and assigning the scores to the electronic communication. For convenience, the operations of the flow chart are described with reference to a system that performs the operations. This system may include one or more components, such as one or more computing devices implementing scoring engine 138 and/or indexing engine 136 of FIG. 2. While operations of method 300 are shown in a particular order, this is not meant to be limiting. One or more operations may be reordered, omitted or added.

At block 352, the system identifies a newly created electronic communication. For example, the system can identify a newly created post that is created by a given user, utilizing a corresponding client device, and that is submitted to a social networking platform for sharing with a plurality of additional users of the platform. In some implementations, the system identifies the newly created post based on data received from the client device, or from a creation engine of the platform, in response to creation of the post. In some implementations, the system identifies the newly created post in response to an entry being created for the post.

At block 354, the system determines a set of features based on content of the identified newly created electronic communication. For example, the system can determine the set of features based on text, image(s), video(s), hyperlink(s), and/or other content of the identified newly created communication. In some implementations, the system determines the set of features further based on an author of the newly created communication, stream(s) to which the newly created communication is shared, user(s) with which the newly created communication is shared, and/or other features. In some implementations, the system determines, for the set of features, null and/or special values for interaction feature(s) for which data does not exist when the electronic communication is newly created.

At block 356, the system generates a request agnostic predicted interaction score using the set of features of block 354, and a trained scoring model. For example, the trained scoring model can be a trained machine learning model, and the system can process the set of features utilizing the trained machine learning model, generate predicted output based on the processing, and can generate the request agnostic predicted interaction score based on the generated predicted output. For instance, the generated predicted output can be used as the request agnostic predicted interaction score, or further processed to generate the request agnostic predicted interaction score.

At block 358, the system assigns the request agnostic predicted interaction score to the electronic communication. For example, the system can index the score with the electronic communication.

At block 360, the system monitors for the occurrence of a rescoring event. The rescoring event can be a daily or other periodic rescoring that occurs for multiple electronic communications and/or the detection of one or more particular types of interactions with the given electronic communication (and optionally at least a threshold quantity of interactions of the particular type(s)).

When the occurrence of a rescoring event is detected by the system at block 360, the system proceeds to block 362, where the system determines a new set of features based on content of the electronic communication, and based on interactions with the electronic communication. The interactions can include the interaction(s) (if any) of the rescoring event detected at block 360, and optionally one or more additional interactions, such as interaction(s) (if any) that may have occurred since a most recent iteration of block 362 for the electronic communication. For example, in some implementations only certain types of interactions constitute a rescoring event at block 360, and the new set of features can include features based on other interaction(s) of other type(s)—even though those interaction(s) did not themselves trigger a rescoring.

At block 364, the system generates a new request agnostic predicted interaction score using the new set of features of block 362, and based on the trained scoring model. For example, the trained scoring model can be a trained machine learning model, and the system can process the new set of features utilizing the trained machine learning model, generate predicted output based on the processing, and can generate the new request agnostic predicted interaction score based on the generated predicted output. For instance, the generated predicted output can be used as the new request agnostic predicted interaction score, or further processed to generate the new request agnostic predicted interaction score.

At block 366, the system assigns the new request agnostic predicted interaction score to the electronic communication. For example, the system can supplant any prior request agnostic predicted interaction score for the electronic communication, with the new request agnostic predicted interaction score. Alternatively, the system can maintain multiple request agnostic predicted interaction scores for an electronic communication, and/or average (or otherwise combines) a new request agnostic predicted interaction score with past request agnostic predicted interaction score(s).

Following block 366, the system proceeds back to block 360 and again monitors for the occurrence of a rescoring event. In response to detecting the occurrence of another rescoring event, the system again performs blocks 362, 264, and 366 to thereby generate an additional new request agnostic predicted interaction score based on an additional new set of features, and assign that additional new request agnostic predicted interaction score to the electronic communication.

Figure 4:
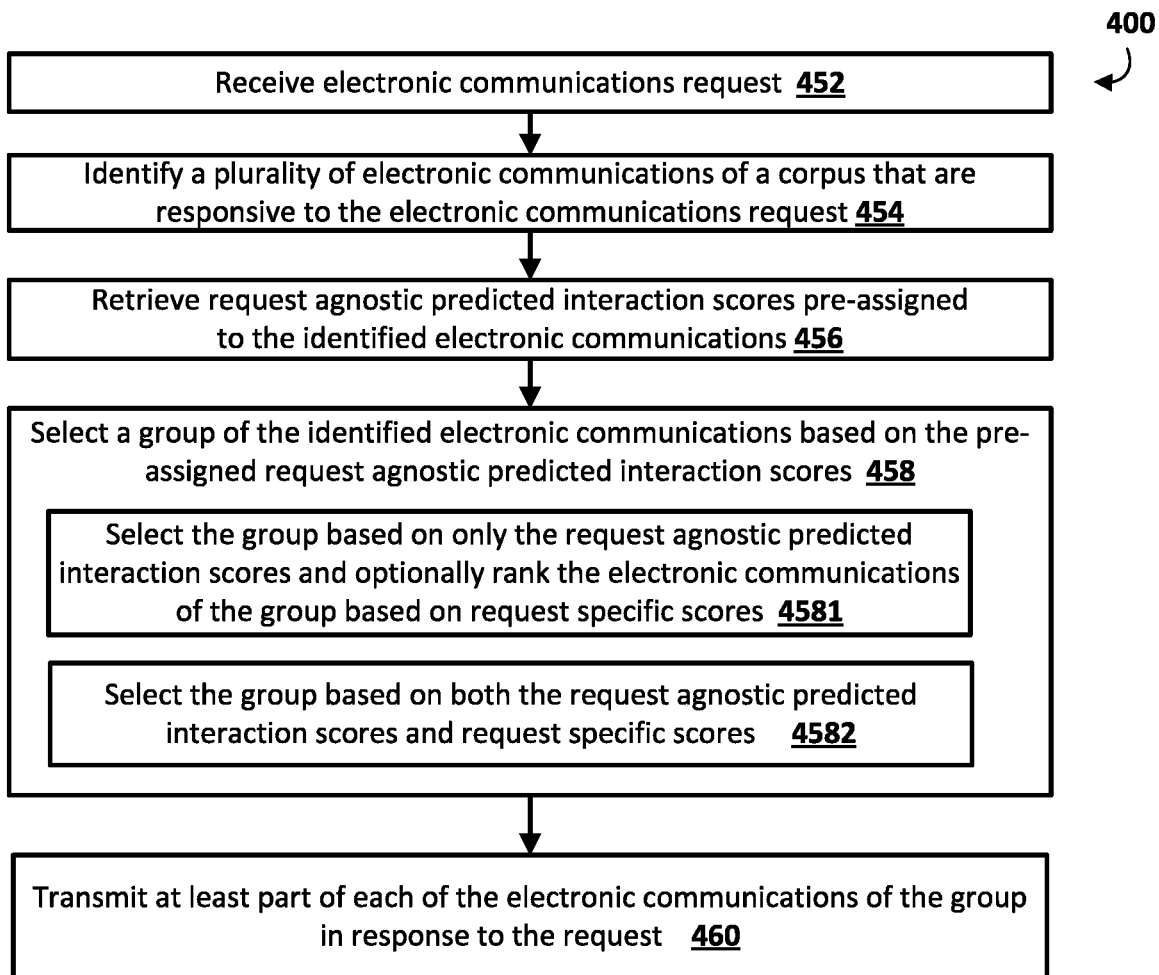
FIG. 4 is a flowchart illustrating a method of utilizing request agnostic predicted interaction measures in determining whether and/or how to provide electronic communications in response to a request, according to various implementations disclosed herein.

FIG. 4 is a flowchart illustrating a method 400 of utilizing request agnostic predicted interaction measures in determining whether and/or how to provide electronic communications in response to a request. For convenience, the operations of the flow chart are described with reference to a system that performs the operations. This system may include one or more components, such as one or more computing systems that implement the delivery system 120 of FIG. 2. While operations of method 400 are shown in a particular order, this is not meant to be limiting. One or more operations may be reordered, omitted or added.

At block 452, the system receives an electronic communications request. The electronic communications request can be for a client device, and can be received from the client device in response to, for example, a user utilizing the client device to access a social networking platform, to open an application associated with the platform, or to submit a search for electronic communications of the platform that pertain to certain keywords and/or certain topics.

At block 454, the system identifies a plurality of electronic communications, of a corpus, that are responsive to the electronic communications request. For example, the system can identify the plurality of electronic communications utilizing an index of the corpus. In some implementations, the request includes one or more criteria for identifying the plurality of electronic communications that are responsive to the request (e.g., term(s) and/or topic(s)/category(ies)), and the system identifies the plurality of electronic communications that are responsive to the request based on those electronic communications being indexed by one or more of the terms and/or one or more of the categories. In some implementations, the request includes, or is otherwise associated with, an identifier of the user of the client device—and the system identifies the plurality of electronic communications additionally or alternatively based on those communications being indicated as being accessible to the user.

At block 456, the system retrieves request agnostic predicted interaction scores that are assigned to the identified electronic communications. The retrieved request agnostic predicted interaction scores can be pre-assigned to the identified electronic communications utilizing method 300 of FIG. 3, and can be indexed with the identified electronic communications.

In many implementations, the request agnostic predicted interaction scores retrieved at block 456 are generated "offline" and are pre-assigned to the identified electronic communications prior to the request being received at block 452. However, in some other implementations, one or more request agnostic predicted interaction scores for one or more of the identified electronic communications can be generated "online". For example, a new (or alternatively, a "first") request agnostic predicted interaction score for a given electronic communication that is responsive to a request can optionally be generated in response to the request, and utilized in lieu of (or in addition to) pre-assigned request agnostic predicted interaction score(s) (if any) for the given electronic communication. Although such a new request agnostic predicted interaction score can be generated "online" and in response to a request, it can still be request agnostic in that it is generated independent of content associated with the request. Various factors can trigger "online" generation of a request agnostic predicted interaction score for a given electronic communication, such as an indication of recent change(s) associated with the given electronic communication (e.g., a recent change in its content, recent re-share(s), recent sentiment input(s)) and/or the given electronic communication not yet having any assigned request agnostic predicted interaction score.

At block 458, the system selects a group of the identified electronic communications based on the request agnostic predicted interaction scores.

In some implementations, in performing block 458, the system performs sub-block 4581. At sub-block 4581, the system selects the group based on only the request agnostic predicted interaction scores. In some implementations of sub-block 4581, the system further ranks the electronic communications of the group based on request specific scores of the electronic communications, where the request specific scores are dependent on the request.

In some implementations, in performing block 458, the system performs sub-block 4582. At sub-block 4582, the system selects the group based on both the request agnostic predicted interaction scores, and based on request specific scores of the electronic communications, where the request specific scores are dependent on the request At block 460, the system transmits at least part of each of the electronic communications of the group, in response to the request of block 452. The transmission can be to the client device associated with the request, and can cause the client device to audibly and/or graphically present the at least part of each of the electronic communications of the group.

Figure 5:
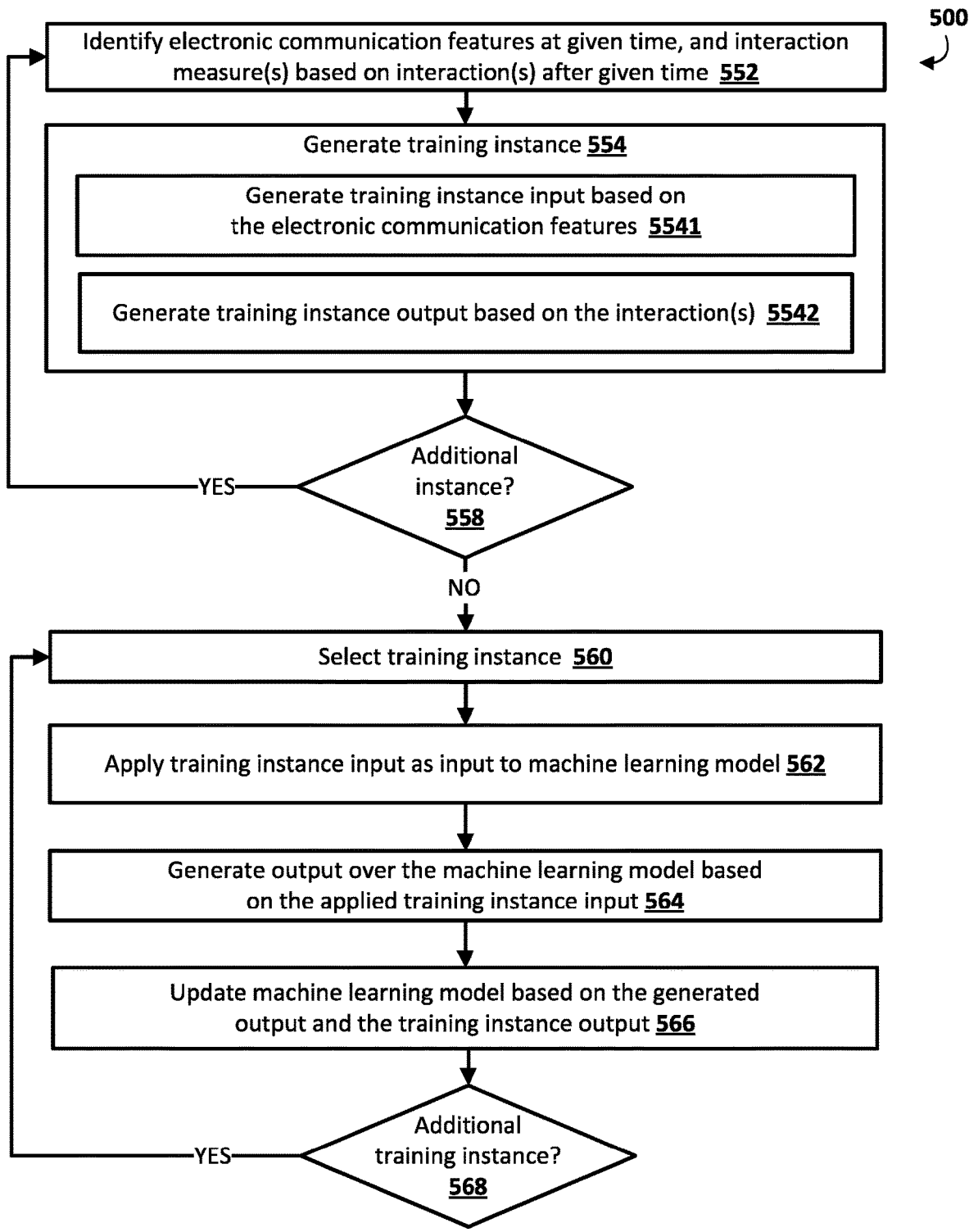
FIG. 5 is a flowchart illustrating a method of training a scoring model that is a machine learning model, according to various implementations disclosed herein.

FIG. 5 is a flowchart illustrating a method 500 of training a scoring model that is a machine learning model. The scoring model of method 500 can be one that, once trained, can be utilized in method 300 of FIG. 3 and method 400 of FIG. 4. For convenience, the operations of the flow chart are described with reference to a system that performs the operations. This system may include one or more components, such as one or more computing devices implementing the training instance engine 165 and training engine 160 of FIG. 1A. While operations of method 500 are shown in a particular order, this is not meant to be limiting. One or more operations may be reordered, omitted or added.

At block 552, the system identifies electronic communication features, of a given electronic communication at a given time, and interaction measure(s) based on interaction(s) with the given electronic communication after the given time.

At block 554, the system generates a training instance based on the information identified at block 552. Block 554 includes sub-block 5541 and sub-block 5542.

At sub-block 5541, the system generates training instance input of the training instance based on the electronic communication features of block 552.

At sub-block 5542, the system generates training instance output of the training instance based on the interaction(s) of block 552.

At block 558, the system determines if additional instances are to be generated. If so, the system may proceed back to block 552 to identify an additional electronic communication (or features and interactions for the same electronic communication, but at a different time), then generates an additional training instance at block 554 based on such additional data.

If not (or in parallel), the system may proceed to blocks 560, 562, 564, 566, and 568 and train, based on generated training instances, a scoring model that is a machine learning model.

At block 560, the system selects a training instance.

At block 562, the system applies training instance input of the training instance as input to the machine learning model.

At block 564, the system generates output over the machine learning based on the applied training instance input.

At block 566, the system updates the machine learning based on the generated output and the training instance output. For example, the system can generate a gradient based on comparison of the generated output and the training instance output, and update the machine learning based on the gradient.

At block 568, the system determines if additional training instances are available. If so (and optionally if other training criterion has not yet been satisfied), the system proceeds back to block 560 and selects an additional training instance. The system may then proceed to blocks 562, 564, and 566 the update the machine learning based on the additional training instance.

It is understood that all or aspects of method 500 may be performed iteratively to train the machine learning. Moreover, in some implementations, once initially trained, method 500 may still be performed periodically and/or at other interval to generate additional training instances, and further train the machine learning model based on such additional training instances.

FIG. 6A and FIG. 6B illustrate example graphical user interfaces 600A and 600B for presenting at least part of electronic communications in response to a corresponding request, where the electronic communications are selected and/or ranked based on request agnostic predicted interaction scores for the electronic communications. The graphical user interfaces 600A and 600B may be presented at one of the client devices 106 (e.g., in a browser executing at a client device and/or in a dedicated electronic communication application executing at a client device) in response to a transmission to the one of the client devices 106 by the delivery system 120 (FIG. 2).

FIG. 6A illustrates an example of content 682A1 from a post and content 682A2 from another post, that each include a "snippet" of information from the corresponding post, and a link (e.g., the underlined text may be a hyperlink) to the entirety of the corresponding post. A user can select, via user interface input, a corresponding link to cause the client device to navigate to the corresponding post. The content 682A1 and/or the content 682A2 may be provided as recommendations based on request agnostic predicted interaction scores assigned pre-assigned (prior to the request) to the corresponding posts. Content from additional posts may also be provided, as indicated by the ellipsis in FIG. 6A. In FIG. 6A, the request to which the interface 600A is responsive can be a "bare" request that does not specify any term and/or any category of content.

FIG. 6B illustrates an example of content 682B1 from a post and content 682B2 from another post, that each include a "snippet" of information from the corresponding post, and a link (e.g., the underlined text may be a hyperlink) to the entirety of the corresponding post. A user can select, via user interface input, a corresponding link to cause the client device to navigate to the corresponding post. In FIG. 6B, the request specifies a term or category 681B of "cats". Accordingly, in FIG. 6B, the content provided in response can be selected based on being indexed by "cats", and based on the request agnostic predicted interaction score. For example, an initial group of posts that are indexed with "cats" can be identified, then a subgroup of the initial group selected based on the request agnostic predicted interaction scores for the posts, and the subgroup transmitted for presentation. Content from additional posts of the subgroup may also be provided, as indicated by the ellipsis in FIG. 6B.

Although examples of graphical interfaces are presented in FIGS. 6A and 6B, it is understood that alternative forms of presenting (audibly and/or graphically) information related to electronic communications may additionally or alternatively be utilized.

FIG. 7 is a block diagram of an example computing device 710 that may optionally be utilized to perform one or more aspects of techniques described herein. Computing device 710 includes at least one processor 714 (e.g., a CPU, GPU, and/or TPU) which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 715. The input and output devices allow user interaction with computing device 710. Network interface subsystem 715 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

What is claimed is:

1. A method implemented by one or more processors, comprising:

for each electronic communication of a corpus of shared electronic communications each shared by a corresponding user to a platform and each accessible to one or more corresponding other users of the platform:

determining a set of features based at least in part on content of the electronic communication;

generating a request agnostic predicted interaction score for the electronic communication based on processing the set of features using a trained machine learning model; and assigning, in one or more databases, the request agnostic predicted interaction score to the electronic communication;

subsequent to assigning the request agnostic predicted interaction scores to the electronic communications and subsequent to the electronic communications being shared to the platform:

receiving an electronic communications request for a client device;

identifying a plurality of the electronic communications of the corpus that are responsive to the electronic communications request;

retrieving, from the one or more databases, the request agnostic predicted interaction scores that were assigned to the identified plurality of the electronic communications prior to receiving the electronic communications request;

selecting, based at least in part on the request agnostic predicted interaction scores, a group of the identified plurality of the electronic communications to provide responsive to the request, wherein the request agnostic predicted interaction scores, used in the selecting, are generated independent of any content associated with the request and independent of any attributes associated with the request;

generating, based on selecting the group, a request specific score for each of the identified plurality of the electronic communications of the group, wherein the request specific scores are separate from the request agnostic predicted interaction scores and are generated based on one or more terms of the request and/or one or more attributes associated with the client device or a user of the client device;

ranking the identified plurality of the electronic communications of the group based at least in part on the request specific scores; and transmitting, to the client device, content from each of the identified plurality of the electronic communications of the group, wherein the content is transmitted with presentation characteristics that are based on the ranking.

2. The method of claim 1, wherein generating each of the request specific scores for the electronic communications is based on both:
the attributes associated with the client device or the user of the client device, and
the one or more terms of the request.

3. The method of claim 1, wherein generating each of the request specific scores is based on the one or more terms included in the request, and wherein generating each of the request specific scores is based on conformance between the one or more terms and a corresponding one of the electronic communications.

4. The method of claim 1, wherein determining the set of features for a given electronic communication of the electronic communications comprises:
determining at least one sentiment feature based on a plurality of sentiment inputs directed toward the given electronic communication.

5. The method of claim 4, wherein determining the at least one sentiment feature based on a plurality of sentiment inputs directed toward the electronic communication comprises:
determining a first sentiment feature based on a quantity of the sentiment inputs directed toward the given electronic communication in a first temporal period; and
determining a second sentiment feature based on an additional quantity of the sentiment inputs directed toward the given electronic communication in a second temporal period.

6. The method of claim 5, wherein the second temporal period encompasses a plurality of second temporal period times that are more distant to a current time than are any first temporal period times of the first temporal period.

7. The method of claim 6, wherein the second temporal period overlaps the first temporal period.

8. The method of claim 1, wherein determining the set of features for a given electronic communication of the electronic communications comprises:
determining at least one sentiment feature based on a plurality of sentiment inputs directed toward the electronic communication;
determining at least one age feature based on time since creation of the given electronic communication;
determining at least one textual content feature based on text of the electronic communication;
determining at least one sharing feature based on a quantity of shares of the electronic communication;
determining at least one stream collection feature based on a stream to which the electronic communication is shared or re-shared; or
determining at least one author feature based on an author of the electronic communication.

9. The method of claim 1, wherein determining the set of features for a given electronic communication of the electronic communications comprises:
determining at least one sentiment feature based on a plurality of sentiment inputs directed toward the electronic communication;
determining at least one age feature based on time since creation of the given electronic communication;
determining at least one textual content feature based on text of the electronic communication;
determining at least one sharing feature based on a quantity of shares of the electronic communication;
determining at least one stream collection feature based on a stream to which the electronic communication is shared or re-shared; and
determining at least one creator feature based on a creator of the electronic communication.

10. The method of claim 1, wherein the trained machine learning model is trained to predict at least one likelihood of engagement with a corresponding electronic communication based on the corresponding set of features for the corresponding electronic communication that are processed by the trained machine learning model.

11. The method of claim 10, wherein the at least one likelihood of engagement includes a likelihood of engagement within a temporal period.

12. The method of claim 10, wherein the at least one likelihood of engagement includes a likelihood of at least a threshold quantity of engagements within a temporal period.

13. A method implemented by one or more processors, comprising:
in response to creation of a shared electronic communication by a creator via a client device:
determining a first set of features based at least in part on content of the electronic communication;
processing the first set of features using a trained machine learning model to generate a request agnostic predicted interaction score for the electronic communication; and
assigning, in one or more databases, the request agnostic predicted interaction score to the electronic communication;
subsequent to assigning the request agnostic predicted interaction score to the electronic communication, and prior to any interaction by any additional user with the shared electronic communication:
  using the request agnostic predicted interaction score in determining whether to transmit, to additional client devices of additional users, at least part of the electronic communication in response to corresponding requests;
subsequent to using the request agnostic predicted interaction score in determining whether to transmit at least part of the electronic communication, detecting occurrence of a threshold quantity of rescoring interactions with the electronic communication and that are of a particular type, the rescoring interactions each being responsive to corresponding user interface input directed to the electronic communication, and the threshold quantity being greater than one;
in response to detecting the occurrence of the threshold quantity of rescoring interactions:
  determining a second set of features based at least in part on the content of the electronic communication, and based on one or more properties of the rescoring interaction;
  processing the second set of features using the trained machine learning model to generate a new request agnostic predicted interaction score for the electronic communication; and
  assigning, in one or more of the databases, the new request agnostic predicted interaction score to the electronic communication;
subsequent to assigning the new request agnostic predicted interaction score to the electronic communication:
  using the new request agnostic predicted interaction score in determining whether to transmit, to one or more further client devices of one or more further users, at least part of the electronic communication in response to one or more corresponding further requests.

14. The method of claim 13, further comprising:
determining one or more additional interactions with the electronic communication that occurred between the creation of the electronic communication and the rescoring interaction, wherein the one or more additional interactions do not trigger rescoring of the electronic communication;
wherein determining the second set of features is further based on the one or more additional interactions.

15. The method of claim 14, wherein the one or more additional interactions include at least one of: a viewing of the electronic communication and a sentiment input directed toward the electronic communication.

16. The method of claim 15, wherein the rescoring interactions include a re-sharing of the electronic communication, and wherein the corresponding user interface input, of the re-sharing, directed to the electronic communication is from a given user that is not the creator, or is from the creator and is an edit of the electronic communication.

17. The method of claim 13, wherein assigning the new request agnostic predicted interaction score to the electronic communication comprises supplanting the request agnostic predicted interaction score with the new request agnostic predicted interaction score.

18. The method of claim 13, wherein the first set of features include a null or special value for an interaction feature, and wherein the second set of features include a particular value for the interaction feature, wherein the particular value is determined based at least in part on the rescoring interaction.

19. The method of claim 13, wherein the rescoring interactions include a sharing of the electronic communication, and wherein the corresponding user interface input, of the sharing, directed to the electronic communication is from a given user that is not the creator, or is from the creator and is an edit of the electronic communication.

* * * * *